United States Patent
Murase

(10) Patent No.: US 6,740,423 B2
(45) Date of Patent: May 25, 2004

(54) COLORED BUILDING BOARDS, MANUFACTURING METHODS THEREOF

(75) Inventor: Naoki Murase, Aichi (JP)

(73) Assignee: Nichiha Corporation, Nagoya (JP)

( * ) Notice: Subject to any disclaimer, the term of this patent is extended or adjusted under 35 U.S.C. 154(b) by 0 days.

(21) Appl. No.: 09/772,871

(22) Filed: Jan. 31, 2001

(65) Prior Publication Data

US 2001/0014402 A1 Aug. 16, 2001

(30) Foreign Application Priority Data

Jan. 31, 2000 (JP) .................................... 2000-021531

(51) Int. Cl.[7] ............................................. B23B 21/04
(52) U.S. Cl. ................. 428/537.1; 428/536; 428/537.7; 428/535; 427/393; 427/393.6; 427/397; 427/403; 427/408
(58) Field of Search ............................ 428/537.1, 536, 428/537.7, 535; 427/393, 393.6, 397, 403, 408

(56) References Cited

FOREIGN PATENT DOCUMENTS

| CA | 2281148 | | 4/2000 |
|---|---|---|---|
| DE | 34 18 002 A1 | | 5/1984 |
| DE | 3418002 | * | 11/1985 |
| JP | 2221140 | | 9/1990 |
| JP | 4-92045 | | 3/1992 |
| JP | 4093237 | * | 3/1992 |
| JP | 5222781 | * | 8/1993 |
| JP | 6-28849 | | 4/1994 |
| JP | 6-88823 | | 11/1994 |
| JP | 7-10582 | | 2/1995 |
| JP | 8-11117 | | 1/1996 |
| JP | 8-91912 | | 4/1996 |
| JP | 8091912 | | 4/1996 |
| JP | 8-151280 | | 6/1996 |
| JP | 2707905 | | 10/1997 |
| JP | 2733158 | | 12/1997 |
| JP | 2771917 | | 4/1998 |
| JP | 10212180 | | 8/1998 |
| JP | 10330141 | * | 12/1998 |
| JP | 10-330141 | | 12/1998 |
| JP | 11147744 | | 6/1999 |
| JP | 11-147744 | | 6/1999 |

OTHER PUBLICATIONS

Copy of Office Action dated Feb. 25, 2003, which was issued in corresponding Canadian Application No. 2,333, 240.

* cited by examiner

Primary Examiner—Leszek B Kiliman
(74) Attorney, Agent, or Firm—Shook, Hardy & Bacon LLP

(57) ABSTRACT

There is provided a building board which is colored by mixture of a pigment(s) into the raw materials and exhibiting an excellent color development effect. A pigment and a resin(s) are incorporated into the raw materials of the front layer to form a resin film simultaneously with cement curing, thereby blocking the inflow or outflow of water through the surface of the substrate to provide a cement board with good waterproofness. The cement board obstructs the efflorescence generation and exhibits an excellent pigment color development effect.

5 Claims, 6 Drawing Sheets

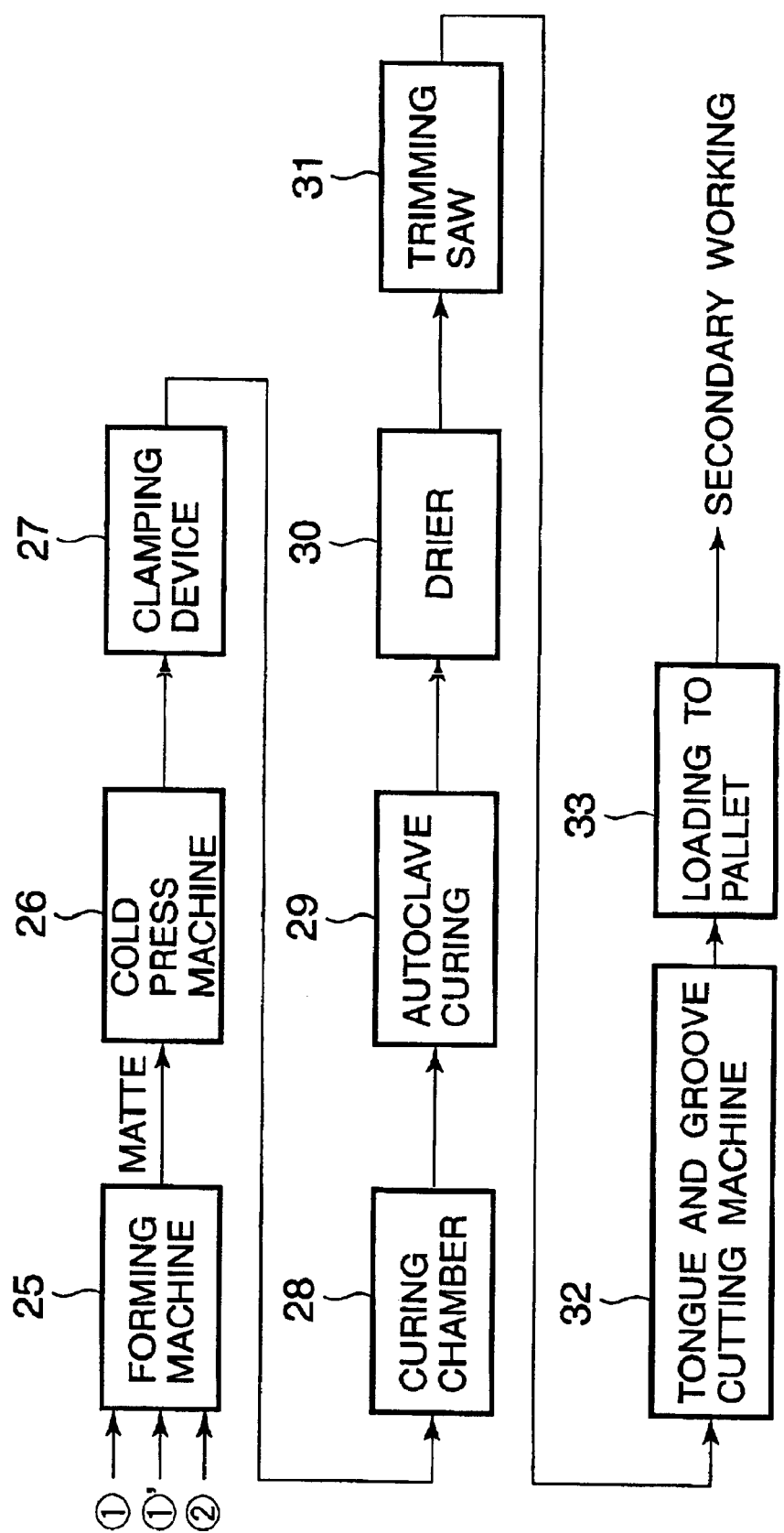

COLORED BUILDING BOARDS, MANUFACTURING METHODS THEREOF

BACKGROUND OF THE INVENTION

1. Field of the Invention

The present invention relates to a ceramic building board, and to the method of manufacturing the ceramic building board. In particular, the present invention relates to a building board which exhibits an excellent color development without relying on coating, and to the method of manufacturing the building board.

2. Description of the Related Arts

With respect to the coloring work for a ceramic building board, "coating" is popular at present. The coating, however, takes many manufacturing steps, and energy cost required for executing plural drying steps and colorant cost become higher. Further, in plural spray coating steps, scattering loss of colorants and the like are not avoidable. On account of that high coating cost, the final product cost of a ceramic building board inevitably comes so expensive.

Moreover, since organic solvents have been used (in some cases, an aqueous emulsion type colorant is used), work environment is getting worse as an inevitable consequence, and the draining treatment cost additionally comes more expensive.

However, it is forced to use "coating" in order to express complicated and unique designs on the surface of a ceramic building board.

Incidentally, as a design expressed on the surface of a ceramic building board, those that made up of groove portions and convex portions occupy the majority of surface designs. Greatly reduced coating cost will be expected, if only groove portions of building board can be colored, without relying on coating. Dry forming process is one of the manufacturing processes for building boards where the forming and curing of cement substrate are done, with the quantity of water to be used being limited to as minimum as possible (see Japanese Patent Publications H6-28849, H6-88823 and H7-10582).

Thus, as a way of coloring the groove portions without relying on the coating, there can be an idea that pigments are directly mixed into the raw materials of cement substrate to manufacture a cement building board.

However, an adverse phenomenon called "efflorescence" is generated during an autoclave maturing process that is an important heat-treating step in the substrate manufacturing, which obstructs the color development by pigments and hence impairs the coloration of the substrate.

The efflorescence is a white material produced in the following manner: causative components that are included in cement curing materials migrate in the form of an aqueous solution to the surface of the substrates at which they are separated by evaporating water component. The efflorescence contains sodium sulfate, calcium carbonate, potassium sulfate, sodium carbonate, sodium hydrogencarbonate, magnesium sulfate, gypsum, potassium hydroxide, etc.

SUMMARY OF THE INVENTION

The present invention is made in view of the above problems and therefore an object of the present invention is to provide a building board which is colored by mixture of pigments into the raw materials and exhibits an excellent color development, and manufacturing method thereof.

Namely, the present invention provides a colored building board comprising front and back layers of high density, whose main components are a wood material(s) and a self-curing inorganic material(s); and a core layer of lower density compared with the front and back layers, whose main components are a wood material(s) and a self-curing inorganic material(s); wherein a pigment(s) and a resin(s), or a pigment(s) and a water-resistant additive(s) are incorporated into at least the front layer among the front and back layers.

Preferably, the above resin(s) is a resin(s) used for mixing with cement.

Further, the above water-resistant additive(s) contains at least one of the materials selected from the group consisting of stearate, calcium acrylate, ammonium oleate, asphalt, paraffin, hydroxyethyl cellulose and maleic acid.

Furthermore, the present invention also provides a colored building board comprising front and back layers of high density, whose main components are a wood material(s) and a self-curing inorganic material(s); and a core layer of lower density compared with the front and back layers, whose main components are a wood material(s) and a self-curing inorganic material(s); wherein at least the front layer among the front and back layers contains a pigment(s) and has a resin film on the surface thereof.

Preferably, the above resin film is a resin used for mixing with cement.

Further, the present invention also provides a colored building board comprising front and back layers of high density, whose main components are a wood material(s) and a self-curing inorganic material(s); and a core layer of lower density compared with the front and back layers, whose main components are a wood material(s) and a self-curing inorganic material(s); wherein at least the front layer among the front and back layers contains a pigment(s) and a anti-efflorescence agent(s).

Preferably, the above anti-efflorescence agent(s) contains at least one of the materials selected from the group consisting of fluoride, carbonate, polyaminocarboxylic acid and maleic acid.

A manufacturing method for manufacturing a colored building board according to the present invention is a dry forming method, wherein a pigment(s) and a resin(s) are incorporated into at least the front layer among said front and back layers to form a resin film simultaneously with cement curing.

Further, a manufacturing method for manufacturing a colored building board according to the present invention is a dry forming method, wherein a pigment(s) and a water-resistant additive(s) are incorporated into at least the front layer among the front and back layers to provide a water-resistant property simultaneously with cement curing.

Furthermore, the above water-resistant additive(s) contains at least one of the materials selected from the group consisting of stearate, calcium acrylate, ammonium oleate, asphalt emulsion, paraffin emulsion, hydroxyethyl cellulose and maleic acid.

Moreover, a manufacturing method for manufacturing a colored building board according to the present invention is a dry forming method, wherein a pigment(s) is incorporated into at least the front layer among the front and back layers, and a resin(s) is coated on a molding board to form a resin film on the surface of the colored building board simultaneously with cement curing.

In addition, a manufacturing method for manufacturing a colored building board according to the present invention is a dry forming method, wherein a pigment(s) is incorporated into at least the front layer among the front and back layers, and a resin(s) is coated on the surface of the cured cement board, and after forming the resin film, the cured cement board is subjected to an autoclave maturing process.

Preferably, the above resin(s) is resin emulsion for mixing with cement.

Further, a manufacturing method for manufacturing a colored building board according to the present invention is a dry forming method, wherein a pigment(s) and a anti-efflorescence agent(s) are incorporated into at least the front layer among the front and back layers, and insoluble salts are generated in the front layer.

Preferably, the above anti-efflorescence agent(s) contains at least one of the materials selected from the group consisting of fluoride, carbonate, polyaminocarboxylic acid and maleic acid.

This specification includes part or all of the contents as disclosed in the specification and/or drawings of Japanese Patent Application No. 21531/2000, which is a priority document of the present application.

BRIEF DESCRIPTION OF THE DRAWINGS

A more complete appreciation of the invention and many of the attendant advantages thereof will be readily understood by reference to the following detailed description when considered in conjunction with the accompanying drawings, wherein:

FIG. 3 is a diagram (No. 2) illustrating a fundamental structure of the method of manufacturing a colored building board;

DESCRIPTION OF THE PREFERRED EMBODIMENTS

Figure 1:
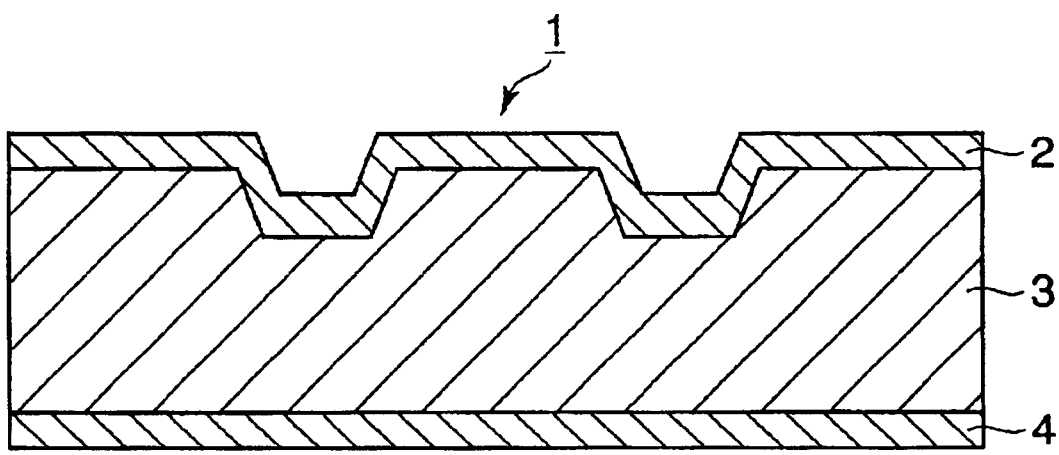
FIG. 1 is a cross-sectional view illustrating a construction of a colored building board according a first embodiment of the present invention.

FIG. 1 is a cross-sectional view illustrating a construction of the colored building board according to a first embodiment of the present invention. The colored building board 1 is an inorganic formed board. It comprises a front layer 2, a back layer 4 and a core layer 3, whose main components are a wood material(s), and a self-curing inorganic material(s). The density of the front layer 2 is almost the same as that of the back layer 4, for instance, within the range of 1.0 to 1.2. Whereas, the density of the core layer 3 is, for instance, within the range of 0.8 to 1.0. On the surface of the front layer 2 emboss works are made. The thickness of these layers are about 1 mm for both front layer 2 and back layer 4, and about 14mm for the core layer 3. A pigment(s) i.e., a coloring material(s) is incorporated into the front layer 2 having a thickness of about 1 mm.

As for the self-curing inorganic material, cements such as Portland cement, blast furnace cement, silica cement, fly ash cement, alumina cement; a mixture containing the above cement and a substance including silica such as silica sand, silica powder, silica fume, cirrus balloon; gypsum; magnesium carbonate; etc are exemplified. The cement and the mixture containing cement and the substance including silica can be cured through a calcium silicate reaction in the presence of water. The gypsum can be cured through a hydration reaction in the presence of water. The magnesium carbonate can be cured through a crystal transition. The aforementioned composition constituting each layer may further contain: cure-promoting agents such as magnesium chloride, magnesium sulfate, calcium chloride, calcium sulfate, sodium aluminate, potassium aluminate, aluminum sulfate, water glass, etc.; or mineral powder such as bentonite, pearlite, etc.

As for the pigment, it can be available iron oxide red (color tone: red, coloring component: $Fe_2O_3$), synthetic iron oxide (red, $Fe_2O_3$), synthetic iron oxide (orange, $Fe_2O_3$), synthetic iron oxide (yellow, $Fe_2O_3 \cdot H_2O$), synthetic iron oxide (purple, $Fe_2O_3$), synthetic iron oxide (black, $Fe_3O_4$ or $Fe_2O_3 \cdot FeO$), chromium oxide (green, $Cr_2O_3$), phthalocyanine blue (blue, organic pigment), carbon black (black, C), titanium oxide (white, $TiO_2$), etc.

Figure 2:
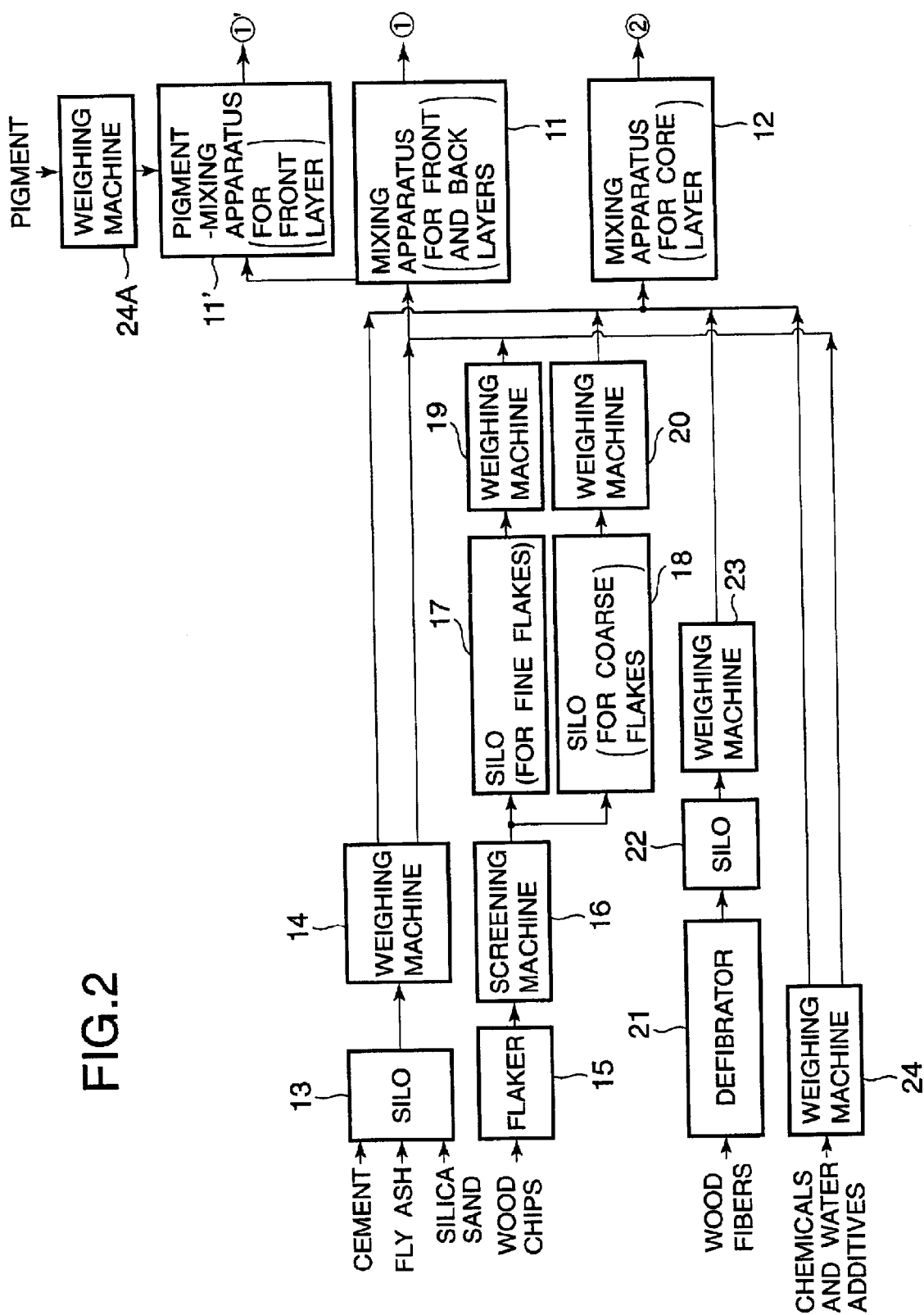
FIG. 2 is a diagram (No. 1) illustrating a fundamental structure of the manufacturing method for a colored building board.

FIGS. 2 and 3 are diagrams illustrating a fundamental structure of the manufacturing method for a colored building board (by dry forming process) according to the present invention. First of all, cement, fly ash and silica powder are stored into a silo 13, and after being weighed using a weighing machine 14, conveyed to a mixing apparatus (for front and back layers) 11 and also to another mixing apparatus (for core layer) 12. On the other hand, chips made of a wood material cut into flakes by means of a flaker 15 and then sieved using a screening machine 16, the resultant fine flakes being conveyed to a silo (for fine flakes) 17 and the resultant coarse flakes to another silo (for coarse flakes) 18. These fine and coarse flakes are weighed using the weighing machines 19 and 20, respectively, and then, conveyed to the mixing apparatus (for front and back layers) 11 and the mixing apparatus (for core layer) 12, respectively.

Meanwhile, fibers are defibrated using a defibrator 21 and then, conveyed to a silo 22. and after that weighed using a weighing machine 23, and conveyed to the mixing apparatus (for core layer) 12. Additionally, chemicals and water are weighed using weighing machine 24, respectively, and then, conveyed to the mixing apparatus (for front and back layers) 11 and also to the mixing apparatus (for core layer) 12. Further, a pigment is weighed using the weighing machine 24A, and then, conveyed to a pigment-mixing apparatus (for front layer) 11'.

Figure 4A:
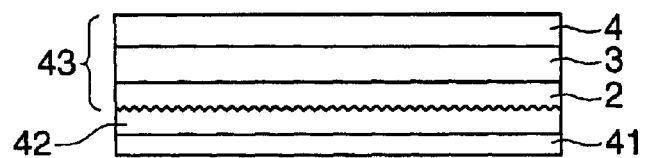
FIG. 4 is a diagram for illustrating the processes of forming, pressing, curing and demolding.
Figure 4B:
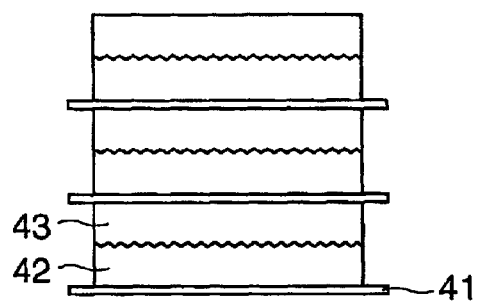

In all of the mixing apparatuses, i.e. the mixing apparatus (for front and back layers) 11, the mixing apparatus (for core layer) 12 and the pigment-mixing apparatus 11', the materials thus conveyed are mixed together and then, conveyed to a forming machine 25. In this forming machine 25, the raw materials for the front layer 2, the core layer 3 and the back layer 4 are successively scattered and deposited on the surface of an FRP mold plate 42 having concavo-convex pattern on which mold release agent is coated on the surface. As a result, a mat 43 i.e., an intermediate product of the colored building board shown in FIG. 1 is formed on the surface of the FRP mold plate 42 (shown in FIG. 4A). Many of the mats 43 are stacked and pressed by a cold press machine 26. On this occasion, the FRP mold plate 42 is placed on an iron plate 41 called a caul plate, and further the mat 43 is placed on the FRP mold plate 42. These three components make one set, many sets being stacked and whole sets are compressed using the cold press machine 26 (see FIG. 4B).

Figure 4C:
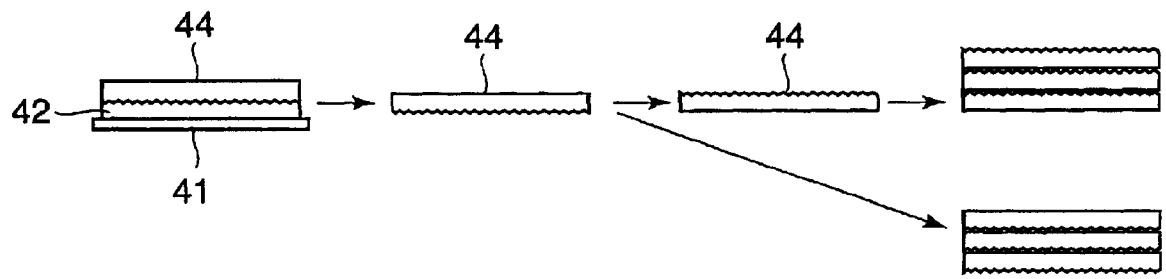

Then, the whole compressed sets are mounted on the clamping device 27 and conveyed to a curing chamber 28 in which these mats 43 are heat-treated for seven hours at temperature ranging from 50 to 70° C. for instance. After this heat treatment, the cured boards 44 are demolded and reversed (or not reversed) for stacking a large number of them again (see FIG. 4C). Thereafter, these cured boards 44 are subjected to an autoclave maturing process (or treatment) 29.

Figure 5A:
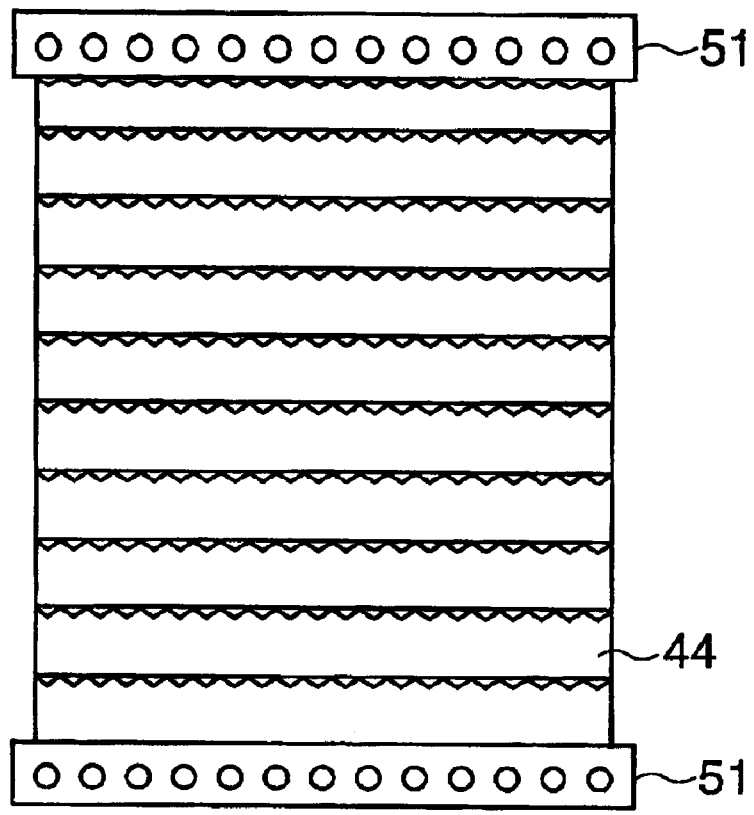
FIG. 5 is a diagram illustrating a stacked state of cured board to be subjected to an autoclave curing, and the efflorescence generating mechanism.

FIG. 5A is a diagram illustrating a stacked state of cured boards 44 to be subjected to an autoclave maturing process and the efflorescence generating mechanism. In this autoclave maturing process 29, the cured boards 44 are matured with each cured boards 44 stacked wherein an iron spacer 51 perforated a large number of through-holes for passing steam is interposed at intervals of, e.g. every ten pieces of the cured boards 44. In this autoclave maturing process 29, the stacked boards are matured at the temperature of 150° C. for nine hours. Including the time required for rising and falling of the temperature of cured boards 44, it will amount to about 15 hours in total.

with respect to the efflorescence generating mechanism, it will be explained hereinafter (see FIG. 5B).

Returning to FIG. 3 again, after finishing the autoclave maturing process 29, the stacked boards are dried using a drier 30 and cut into a predetermined size using a trimming saw 31. Then after finishing the work for forming tongues and grooves by a cutting machine 32, the stacked boards are loaded to pallets so as to subject to the next secondary working (coating step, etc.).

FIGS. 6A through 6D are diagrams illustrating a countermeasure preventing efflorescence generation, which will be explained in the following First to Forth embodiments.

(First Embodiment)

In the dry forming process, a resin(s) is incorporated in the raw materials of the front and back layers 2 and 4, resin films are formed inside as well as on the surface of the cured boards 44 simultaneously with cement curing. This enables the inflow and outflow of water through the surface of the substrate to be blocked, and provides the cement board itself with good waterproofness (see FIG. 6A). As a result, the cement board exhibits an excellent color development of the pigment, as the efflorescence generating effect of the cement board can be prevented.

The resins usable in this embodiment are for mixing with cement as exemplified below.

Namely, polyvinyl acetate (PVAc), polymethyl methacrylate :(PMMA), polyethyl methacrylate (PEMA), polystyrene (PSt), polyacrylonitrile (PAN), polymethacrylonitrile (PMAN), polyvinyl chloride (PVC), polyacrylic acid (PAA), polyvinyl alcohol (PVA), polyethylene (PE), polybutadiene (PBut), polyvinyl versate (PVV), polyethyl acrylate (PEA), polybutyl acrylate (PBA), poly 2-ethylhexyl acrylate (P2EHA), polyvinylidene chloride (PVdC), polychloroprene (PCR), and copolymers thereof in the form of an emulsion.

Additives which have similar properties are indicated below. Namely, stearate, calcium acrylate, ammonium oleate, asphalt emulsion, paraffin emulsion, hydroxyethyl cellulose and maleic acid. These substances can be interposed between cements or between cement and fly ash or silica sand, which exhibits a water repellent effect (see FIG. 6B).

The results of this embodiment are listed in Table 1.

TABLE 1

|  | Comp. sample(%) | Test sample(%) |
|---|---|---|
| Cement | 38 | 38 |
| Fly ash + silica sand | 38 | 38 |
| Wood flake | 20 | 20 |
| Pigment | ~4~ | ~4~ |
| Water | 25 | 25 |
| Resin (externally added) | 0 | 2 |
| Efflorescence | generated | not generated |

The cement employed herein was "normal Portland cement, Taiheiyo Cement Co., Ltd.", the silica sand was "Sanei Silica", and the fly ash was "Chuden FA".

Figure 5B:
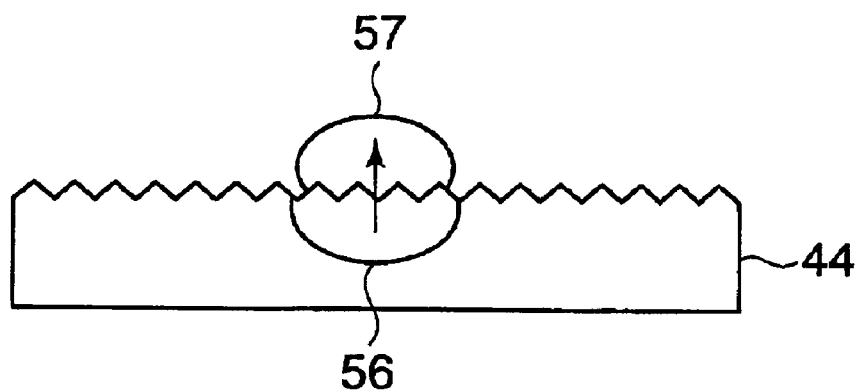
Figure 6A:
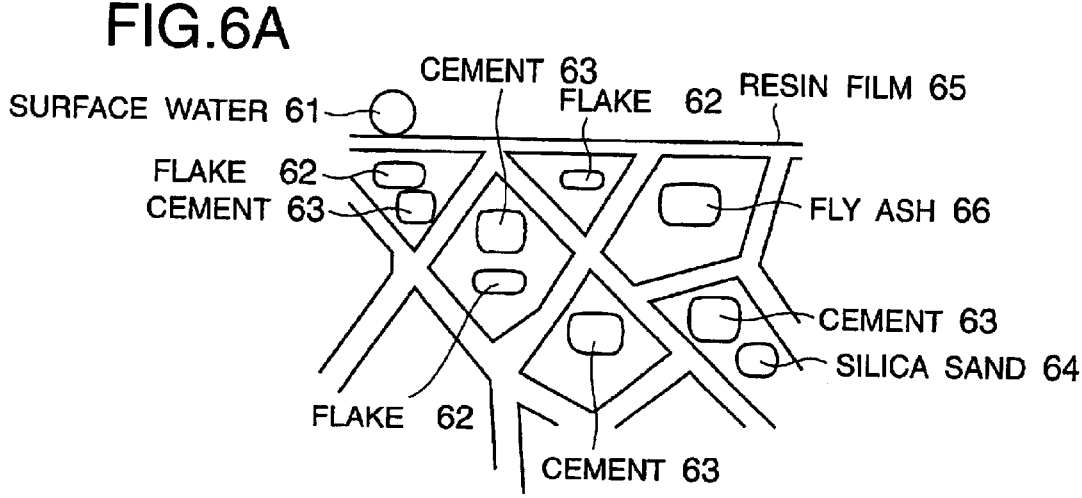
FIGS. 6A through 6D are diagrams illustrating a countermeasure preventing the efflorescence generation.
Figure 6B:
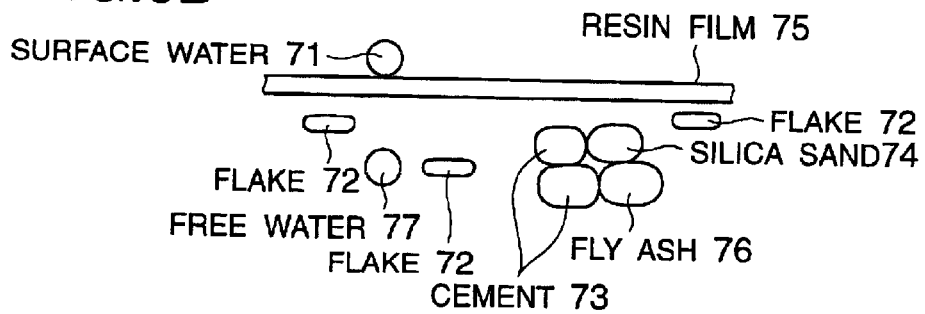
Figure 6C:
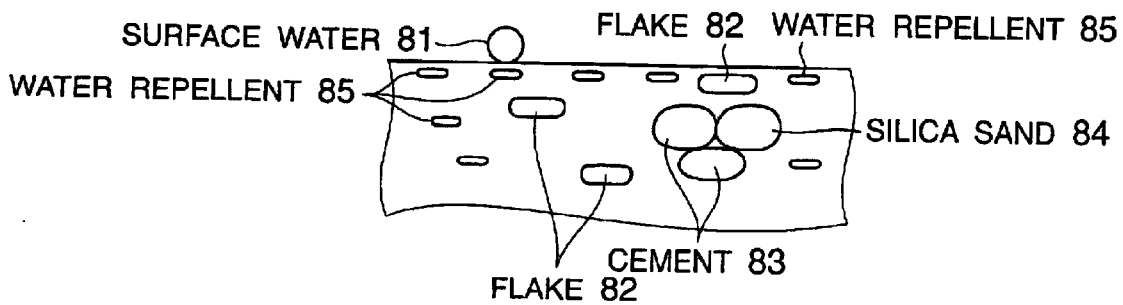
Figure 6D:
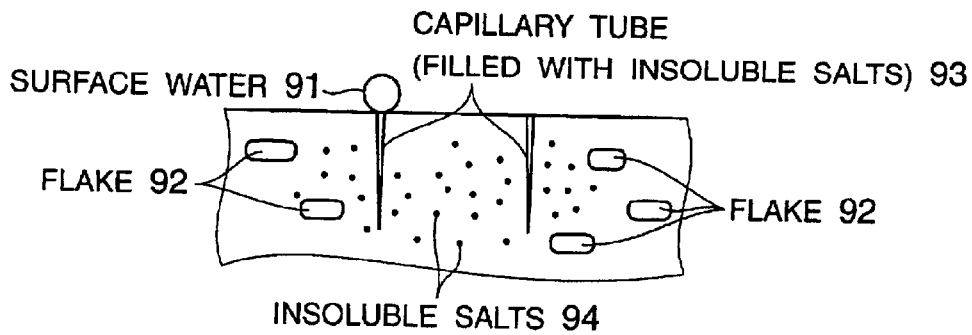

In FIG. 5B, if any countermeasure for the inflow and outflow of water from the surface of the cured board 44 is not taken as usual, inorganic matters of a high concentration in the free water inside the cured board 44 will migrate to the condensed surface water 57, so that the efflorescence is generated due to the surface water evaporation. Thus, the color development of pigment is suffered from deterioration. Whereas, in the embodiment, the resin films formed in the inside as well as on the surface of the cured board 44 act as a blocking means for the inflow and the outflow of water, so that the efflorescence generating is prevented, thus making it possible to achieve an excellent color development effect of pigment.

(Second Embodiment)

In the dry forming process, an in-line sealer (resin) is coated on a molding board (the quantity of coating may be about 10 g/square foot), and a resin film is formed on the surface of the cured,boards 44 simultaneously with cement curing, followed by an autoclave maturing process. As a result, by virtue of the resin film that has been formed on the surface of the cured board 44, the inflow and outflow of water through the surface of the substrate are blocked during the autoclave maturing process. Consequently, the cement board thoroughly prevents the efflorescence generation, thus exhibiting an excellent color development effect of the pigment (see FIG. 6B).

As the resins usable as the in-line sealer, resins for mixing with cement are suitable as exemplified below.

Namely, polyvinyl acetate (PVAc), polymethyl methacrylate (PMMA), polyethyl methacrylate (PEMA), polystyrene (PSt), polyacrylonitrile (PAN), polymethacrylonitrile (PMAN), polyvinyl chloride (PVC), polyacrylic acid (PAA), polyvinyl alcohol (PVA), polyethylene (PE), polybutadiene (PBut), polyvinyl versate (PVV), polyethyl acrylate (PEA), polybutyl acrylate (PBA), poly 2-ethylhexyl acrylate (P2EHA), polyvinylidene chloride (PVdC), polychloroprene (PCR), and copolymers thereof, in the form of emulsion.

Additives which have similar properties are indicated below. Namely, stearate, calcium acrylate, ammonium oleate, asphalt emulsion, paraffin emulsion, hydroxyethyl cellulose and maleic acid.

The results of this embodiment are listed in Table 2.

TABLE 2

|  | Comp. sample(%) | Test sample(%) |
|---|---|---|
| Cement | 38 | 38 |
| Fly ash + silica sand | 38 | 38 |
| Wood flake | 20 | 20 |
| Pigment | ~4~ | ~4~ |

TABLE 2-continued

|  | Comp. sample(%) | Test sample(%) |
|---|---|---|
| Cement | 38 | 38 |
| Water | 25 | 25 |
| Resin coating to molding board | None | Yes |
| Efflorescence | generated | not generated |

The in-line sealer employed herein was a silicon acrylic emulsion sealer, wherein nonvolatile component contained was about 30%.

Coating conditions are: 50 to 60° C. for preheating temperature of the substrate, and 60 to 70° C. for drying temperature after the in-line sealer coating.

(Third Embodiment)

In the dry forming process, an in-line sealer (resin) is coated on the surface of a cured board (the quantity of coating may be about 10 g/square foot), and coated layer is dried at temperature of 60 to 70 to form a resin film on the surface of the cured board 44. Thereafter, the cured board 44 is subjected to an autoclave maturing process. During this autoclave maturing process, the inflow and outflow of water through the surface of the substrate are blocked by virtue of the presence of the formed resin film. As a result, the cement board thoroughly prevents the efflorescence generation, thus exhibiting an excellent color development effect of the pigment (see FIG. 6B).

The resins and additives usable in this embodiment are the same as those set forth in the second embodiment.

The results of this embodiment are listed in Table 3.

TABLE 3

|  | Comp. sample(%) | Test sample(%) |
|---|---|---|
| Cement | 38 | 38 |
| Fly ash + silica sand | 38 | 38 |
| Wood flake | 20 | 20 |
| Pigment | ~4~ | ~4~ |
| Water | 25 | 25 |
| Resin coating to cured board | None | Yes |
| Efflorescence | generated | not generated |

(Fourth Embodiment)

In the dry forming process, for the purpose of fixing soluble salts in raw materials into the substrate, various kinds of additives are contained in the raw materials. The production of the insoluble salts prevents from eluating into water, and at the same time, the insoluble salts thus produced are filled in the capillary tube in the cement mortar, thereby clogging interstices in the cement mortar and improving the diffusion and permeation resistance of water (see FIGS. 6C and 6D). This prevents the efflorescence generation, thus the cement board exhibiting an excellent color development effect of the pigment.

The additives usable in this embodiment are indicated below. Namely, fluoride, carbonate (such as ammonium carbonate, sodium carbonate and barium carbonate), polyaminocarboxylic acid, maleic acid, etc.

Fluoride and carbonate are used for turning calcium ion into insoluble material by changing it into calcium fluoride and the like. Further, barium salt such as barium carbonate is used for turning it into insoluble materials by changing it into barium sulfate. In particular, barium carbonate and barium stearate are used for turning not only sulfate ion but also calcium ion into insoluble materials.

This can be shown by the following chemical formulas:

$$(NH_4)_2CO_3 + Ca^{2+} \rightarrow CaCO_3\downarrow + 2NH_4^{+1}$$

$$BaCO_3 + Ca^{2+}SO_4^{2-} \rightarrow BaSO_4\downarrow + CaCO_3\downarrow$$

(Note)

↑: a volatile component

↓: insoluble components $CaCO_3$ constituting a whitening component will be generated by chemical reaction with $CO_2$ existing in air at the surface of the cement board, while dissolving $Ca^{2+}$ and $Ca(OH)_2$ in water. When these additives are contained in raw materials, insoluble $CaCO_3$ should be generated previously so as to prevent them from being eluated.

The results of this embodiment are listed in Table 4.

TABLE 4

|  | Comp. sample(%) | Test sample(%) |
|---|---|---|
| Cement | 38 | 38 |
| Fly ash + silica sand | 38 | 38 |
| Wood flake | 20 | 20 |
| Pigment | 4 | 4 |
| Water | 25 | 25 |
| BaCO3 (externally added) | 0 | 2 |
| Efflorescence | generated | improved |

The pigments employed and the mixing ratios thereof are listed in Table 5.

TABLE 5

| Colors developed Pigments | Brown | Green | Beige | Red |
|---|---|---|---|---|
| BK(318) |  | 20% |  |  |
| RD(180M) | 1.4% |  | 1.3% | 3.0% |
| YL(920) | 0.8% |  | 0.9% |  |
| GN(GN) |  | 1.5% |  |  |
| WT(Ti) |  |  | 0.5% |  |

Following inorganic pigments (available from Bayer Co., Ltd.) were employed:

Bayfellox BK (black) 318

Bayfellox RD (red) 180M

Bayfellox YL (yellow) 920

Bayfellox GN (green) GN

Bayfellox WT (white) Ti

It should be noted that the present invention is not limited to the aforementioned embodiments.

As explained above, according to the present invention, the surface of building board is already colored prior to performing the coating, and there is no need to worry about deterioration of coloring due to the efflorescence generation. Thus, it eliminates the need for the coating of ground-color (the color of groove portions relative to projected portions). Therefore, the cost for the coating can be greatly reduced so much. It is also possible to develop a kind of commodity to enjoy a feeling of cement board with only a clear coating being applied on the ground-color, without coating projected portions or decorative coating of building board, leaving the ground color of building board as it is.

In the case of ordinary coated building boards, the thickness of coating is used to be relatively thin. On that account, when the coating is scratched, the color (grey) of the substrate of cement board is easily exposed. This results in the external appearance thereof being made so ugly that there is no other way but to repaint the cemment board. Whereas, in the case of the colored building board according to the present invention, since the colored front layer is relatively thick, the gray color peculiar to the cement board is by no means exposed, even if the surface of the building board is scratched more or less, which makes it possible not to show the scratched portions when one looked at from a distance.

What is claimed is:

1. A colored building board comprising:
    a dry formed front layer having a first density, the front layer having main components including wood material and self-curing inorganic material;
    a dry formed back layer having a second density, the back layer having main components including wood material and self-curing inorganic material; and
    a dry formed core layer having a third density that is lower in density when compared with said first density and said second density, the core layer having main components including wood material and self-curing inorganic material;
    wherein at least said front layer contains pigment and at least one anti-efflorescence agent which produces a colored layer and insoluble salts simultaneously with curing of the self-curing inorganic material contained therein.

2. The colored building board according to claim 1, wherein said anti-efflorescence agent comprises at least one material selected from the group consisting of fluoride, carbonate, polyaminocarboxylic acid and maleic acid.

3. A manufacturing method for manufacturing a colored building board by a dry forming process, comprising the steps of:
    forming a front layer to yield a first finished density in a finished board, the front layer having main components including wood material and self-curing inorganic material;
    forming a core layer to yield a second finished density in a finished board that is lower in density than the first finished density, the core layer having main components including wood material and self-curing inorganic material; and
    forming a back layer to yield a third finished density in a finished board that is higher in density when compared with said second finished board density, the back layer having main components including wood material and self-curing inorganic material;
    incorporating pigment and an anti-efflorescence agent into at least the front layer; and
    curing the building board and simultaneously forming the colored effect and producing insoluble salts within the building board.

4. A manufacturing method for manufacturing a colored building board according to claim 3, wherein said anti-efflorescence agent comprises at least one material selected from the group consisting of fluoride, carbonate, polyaminocarboxylic acid and maleic acid.

5. The building board according to claim 1, wherein the first finished density is substantially the same as the second finished density.

* * * * *